Patented Feb. 22, 1949

2,462,742

UNITED STATES PATENT OFFICE 2,462,742

ARYL TRICHLOROTHIO ACETATES IN ELASTOMER TREATMENT

Alban Thomas Hallowell, Parlin, N. J., assignor to E. I. du Pont de Nemours & Company, Wilmington, Del., a corporation of Delaware No Drawing. Application March 13, 1947, Serial No. 734,549

6 Claims. (Cl. 260—86.5)

This invention has as an object the preparation of elastomers of improved properties. Other objects will appear hereinafter.

These objects are accomplished by the following invention wherein a synthetic elastomer containing in major proportion units derived from a conjugated diene is treated with 0.01 to 7.5% of an aryl trichlorothiolacetate.

The esters which are employed in the present invention may be prepared by adding trichloroacetyl chloride to a benzene solution of an equimolecular amount of a thiophenol and an equivalent amount of pyridine as disclosed in greater detail in my copending application Serial Number 617,441, the disclosure of which is herewith incorporated. The present application is a continuation-in-part of application Serial Number 617,441; filed Sept. 19, 1945.

The following examples in which parts are by weight are illustrative of the invention.

An emulsion was prepared from 45 parts butadiene, 15 parts styrene, 3 parts soap chips, 111 parts water, 0.18 part potassium persulfate and 0.45 part xylyl trichlorothiolacetate. Polymerization was brought about by heating at 50° C. for 16 hours. The polymer was separated by coagulation. A similar polymerization was effected differing from the above only in that 0.30 part of dodecyl mercaptan was substituted for 0.45 part xylyl trichlorothiolacetate. The two polymeric products were vulcanized by heating for 30 minutes at 153° C. by using the following formulation: 100 parts polymer, 2 parts sulfur, 50 parts "Micronex" carbon black, 2 parts stearic acid, 5 parts zinc oxide, and 1.25 parts 2-mercaptothiazoline. The following table shows the difference in properties of these vulcanizates (A in the table represents the rubber prepared with xylyl trichlorothiolacetate as the modifier and B that prepared with dodecyl mercaptan as the modifier).

Example I

|  | A | B |
| --- | --- | --- |
| Tensile strength, lbs./sq. in | 2,880 | 2,740 |
| Elongation at break, percent | 450 | 375 |
| Tear strength, lb./in | 260 | 230 |

When an aliphatic ester of trichlorothiolacetate was used as a modifying agent in the polymerization of styrene-butadiene, an unsatisfactory polymer was obtained. The polymerization was carried out by heating the following emulsion at 40° C. for 20 hours: 45 parts butadiene, 15 parts styrene, 2.4 parts oleic acid, 0.66 part sodium hydroxide (U. S. P.), 0.6 part potassium persulfate, 90 parts water, 0.09 part potassium ferricyanide, and 0.6 part "Daxad 11" (condensation product of formaldehyde and sodium betanaphthalenesulfonate). Dodecyl trichlorothiolacetate was added to the emulsion in amount of 0.77 part in one experiment, 1.03 parts in another, and 1.42 parts in a further experiment. The resulting rubbers were obtained in coagulating the emulsion and milling in yields of 36 parts (60%), 38 parts (63%) and 90 parts (67%) respectively. The mill behavior for these rubbers was very poor, and the rubbers showed poor tack. These results can be compared to a rubber obtained in the manner described above except that 0.74 part dodecyl mercaptan was employed. This rubber was obtained in 93% yield and showed good mill behavior with fair tack.

Example II

The following formulations were prepared:

A

|  | Parts |
| --- | --- |
| GR-S | 100 |
| Sulfur | 2 |
| "Micronex" carbon | 50 |
| Stearic acid | 2 |
| Zinc oxide | 5 |
| Xylyl trichlorothiolacetate | 5 |

B

|  | |
| --- | --- |
| GR-S | 100 |
| Sulfur | 2 |
| "Micronex" carbon | 50 |
| Stearic acid | 2 |
| Zinc oxide | 5 |
| 2-Mercaptothiozoline | 1.25 |

The optimum conditions for curing these two formulations were employed. These were for A—60 minutes at 153° C. and for B—30 minutes at 153° C. The following table shows the superiority of the vulcanizates in which the aromatic trichlorothiolacetate was employed.

|  | A | B |
| --- | --- | --- |
| Tensile strength, lb./sq. in | 3,420 | 2,380 |
| Elongation at break, percent | 690 | 390 |
| Tear strength, lb./in | 475 | 269 |

The invention has been illustrated above with the employment of xylyl trichlorothiolacetate in the preparation and vulcanization of butadiene/styrene copolymers. The invention is generic, however, to the treatment of synthetic elastomers containing major amounts of units derived from a diene, employing aromatic trichlorothiolacetates and particularly aryl trichlorothiolacetates including phenyl trichlorothiolacetate, alpha-naphthyl trichlorothiolacetate, p-cresyl trichlorothiolacetate, o-carboxyphenyl trichlorothiolacetate, xylenyl trichlorothiolacetate and m-phenylene bis(trichlorothiolacetate). The trichlorothiolacetates may be prepared from thiophenols containing one, two, or more thiol groups in the molecule and, in the case of polythiols, one or more of the thiol groups may be esterified by the trichloroacetyl radical. The trichlorothiolacetate may have on the aromatic nucleus inert groups such as halogen, nitrile, ether, etc.

In the process of this invention any synthethic elastomer containing major amounts, 50-100%, of units derived from a conjugated diene, e. g. butadiene, isoprene, 2-chlorobutadiene-1,3,2-fluorobutadiene-1,3 and from 0 to 50% of other polymerizable monoethylenic compounds having a terminal methylene group, e.g. acrylic and methacrylic esters, amides and nitriles including methyl methacrylate, acrylamide and acrylonitriles, vinyl compounds, e. g. vinyl aryls such as styrene, and vinylnaphthalene, vinylpyridines, vinylthiophene, vinylisocoumarans, vinylethynylcarbinol, methyl vinyl ketone, etc. may be employed including butadiene/styrene copolymers of 50% to 95% butadiene content, the remainder being styrene, butadiene/acrylonitrile copolymers of 50 to 95% butadiene content, the remainder being acrylonitrile, chloroprene polymers, etc.

When the process of this invention is employed in connection with polymerization the polymerization is conducted according to known methods except for the incorporation of the thiolacetate. The temperature of polymerization can range from 10 to 100° C., the time from a few minutes to several hours. Time, temperature, reactant ratios (including the ratio of monomers to modifier, ratio of aqueous to non-aqueous ingredients and of soap to monomers), catalyst concentration (which is usually of the peroxy type and is present in amounts of 0.01-5% based on the weight of polymerizable monomers) are interdependent variables, e.g. increased rate of reaction generally occurs with increased temperature and increased amount of catalyst.

The concentration of aromatic trichlorothiolacetate may vary from 0.01 to 7.5%, based on the weight of polymerizable monomers but preferably between 0.1 and 3%.

The vulcanization according to this invention may be carried out by the usual methods. Thus the elastomer (100 parts) is mixed on a rubber mill or in suitable rubber mixing equipment with sulfur (1-3 parts), stearic acid (about 1 part), zinc oxide (2-10 parts) or mixtures of zinc oxide with litharge or magnesium oxide, and carbon black (20-100 parts). The carbon black may be channel black (reinforcing black), semi-reinforcing black, or soft black. In addition, other fillers such as silica and clay may be added. For some purposes it may be desirable to add softening agents such as process oil, pine tar, petroleum cracking residues, etc. Finally the vulcanization accelerator (aryl trichlorothiolacetate) is added and the stock, after thorough mixing is formed as desired and the vulcanization carried out at temperatures between 100 and 160° C. In the vulcanization from 0.01 to 7.5%, based on the weight of the elastomer, of the aromatic trichlorothiolacetate may be employed, but preferably between 1 and 7.5%.

The foregoing detailed description has been given for clearness of understanding only and no unnecessary limitations are to be understood therefrom. The invention is not limited to the exact details shown and described for obvious modifications will occur to those skilled in the art.

What is claimed is:

1. In the emulsion copolymerization of butadiene with about ⅓ its weight of styrene, the improvement wherein between 0.1 and 3%, based on the weight of the polymerizable monomers, of xylyl trichlorothiolacetate is employed.

2. In the emulsion copolymerization of butadiene with about ⅓ its weight of styrene, the improvement wherein between 0.1 and 3%, based on the weight of the polymerizable monomers, of an aryl trichlorothiolacetate is employed.

3. In the preparation of elastomers having a major proportion of butadiene, the improvement wherein an emulsion polymerization of a monomer composition predominating in butadiene is carried out in the presence of from 0.1 to 3%, based on the weight of the polymerizable monomers, of xylyl trichlorothiolacetate.

4. In the preparation of elastomers having a major proportion of butadiene, the improvement wherein an emulsion polymerization of a monomer composition predominating in butadiene is carried out in the presence of from 0.1 to 3%, based on the weight of the polymerizable monomers, of an aryl trichlorothiolacetate.

5. In the preparation of elastomers, the improvement wherein a monomer composition predominating in a conjugated diene of the class consisting of butadiene, isoprene, 2-chlorobutadiene-1,3, and 2-fluorobutadiene-1,3 is emulsion polymerized in the presence of from 0.1 to 3%, based on the weight of the polymerizable monomers, of xylyl trichlorothiolacetate.

6. In the preparation of elastomers, the improvement wherein a monomer composition predominating in a conjugated diene of the class consisting of butadiene, isoprene, 2-chlorobutadiene-1,3, and 2-fluorobutadiene-1,3 is emulsion polymerized in the presence of from 0.1 to 3% based on the weight of the polymerizable monomers, of an aryl trichlorothiolacetate.

ALBAN THOMAS HALLOWELL.

REFERENCES CITED

The following references are of record in the file of this patent:

UNITED STATES PATENTS

| Number | Name | Date |
|---|---|---|
| 2,420,194 | Richards | May 6, 1947 |

Certificate of Correction

Patent No. 2,462,742.

February 22, 1949.

ALBAN THOMAS HALLOWELL

It is hereby certified that errors appear in the printed specification of the above numbered patent requiring correction as follows:

Column 1, line 15, after "617,441," and before "the" insert the words and comma *filed Sept. 19, 1945,*; line 18, strike out "; filed Sept. 19, 1945"; line 21, before the paragraph beginning with "An emulsion" insert the heading *Example I*; line 41, strike out "Example I"; column 3, line 15, for "synthethic" read *synthetic*; and that the said Letters Patent should be read with these corrections therein that the same may conform to the record of the case in the Patent Office.

Signed and sealed this 16th day of August, A. D. 1949.

[SEAL]

THOMAS F. MURPHY,
*Assistant Commissioner of Patents.*